United States Patent [19]

Angle

[11] E Patent Number: Re. 32,669

[45] Reissued Date of Patent: May 17, 1988

[54] ENERGY AMPLIFIER APPARATUS

[76] Inventor: Lonnie L. Angle, 2207 E. McDowell, Mesa, Ariz. 85203

[21] Appl. No.: 850,168

[22] Filed: Apr. 10, 1986

Related U.S. Patent Documents

Reissue of:

[64] Patent No.: 4,278,405
Issued: Jul. 14, 1981
Appl. No.: 5,210
Filed: Jan. 22, 1979

[51] Int. Cl.[4] ..... F04F 3/00; F04F 5/08

[52] U.S. Cl. ..... 417/150; 417/151; 417/176

[58] Field of Search ..... 417/151, 150, 176

[56] References Cited

U.S. PATENT DOCUMENTS

| | | | |
|---|---|---|---|
| 1,117,626 | 11/1914 | Bassler | 417/176 |
| 1,589,888 | 6/1926 | Lummis | 417/176 |
| 1,804,569 | 5/1931 | Taddiken | 417/176 |
| 2,057,218 | 10/1936 | Timpson | 417/176 |
| 2,070,562 | 2/1937 | Coyne et al. | 417/151 |
| 2,191,717 | 2/1940 | Jeffery | 417/151 |
| 2,382,421 | 8/1945 | Johnson et al. | 417/150 |

FOREIGN PATENT DOCUMENTS

| | | | |
|---|---|---|---|
| 101153 | 1/1898 | Fed. Rep. of Germany | 417/176 |
| 357084 | 1/1920 | Fed. Rep. of Germany | 417/150 |

*Primary Examiner*—Edward K. Look
*Attorney, Agent, or Firm*—Cahill, Sutton & Thomas

EXEMPLARY CLAIM

Energy amplifier apparatus includes a pair of vertically extending concentric cylinders, with air entrained in water flowing downwardly through *a conduit within* the inner cylinder to a separator where the air is separated from the water. The falling water compresses the entrained air and a separator in the inner cylinder is used to separate the compressed air from the water, with the water flowing upwardly between the inner and outer cylinders and the compressed air flowing upwardly in a separate conduit from [the upper portion of] the inner cylinder.

17 Claims, 2 Drawing Sheets

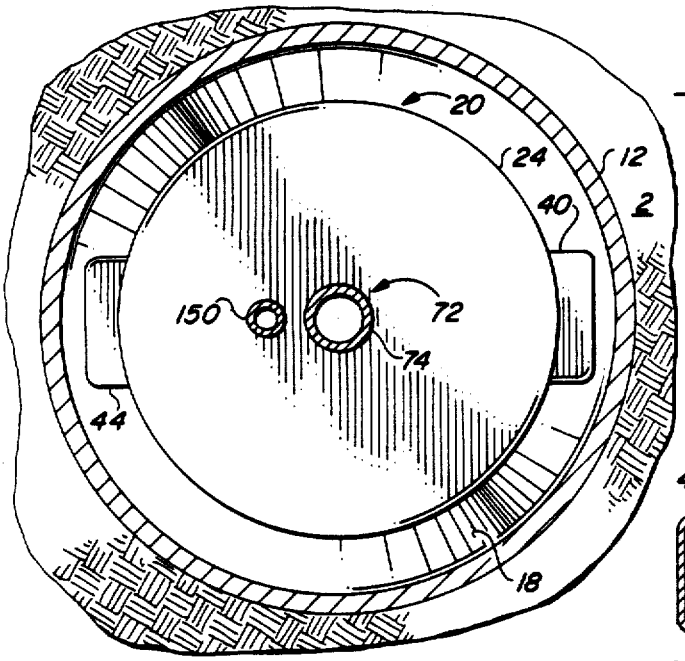
FIG. 3
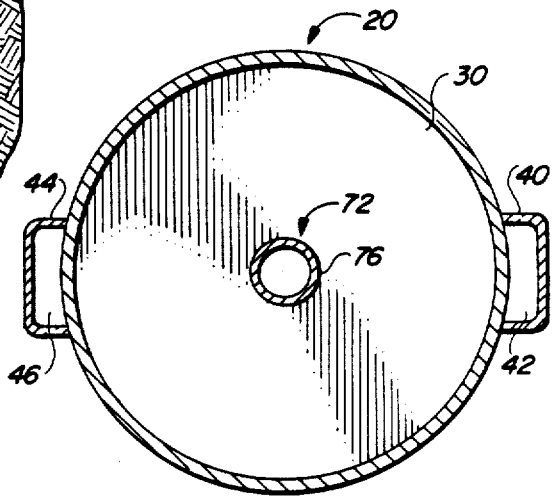
FIG. 4
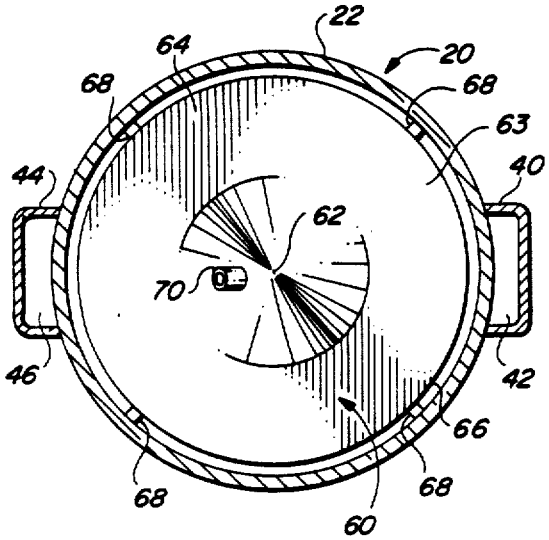
FIG. 5
FIG. 6
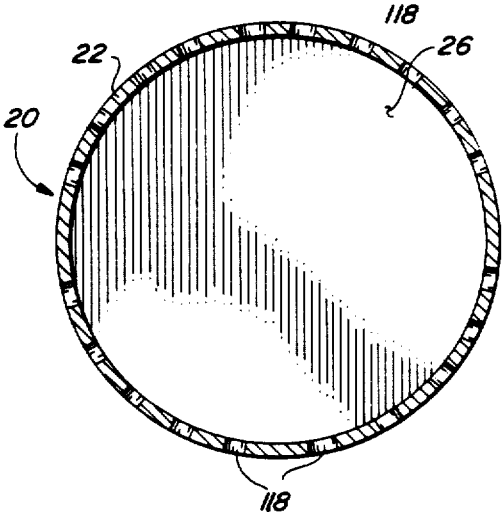
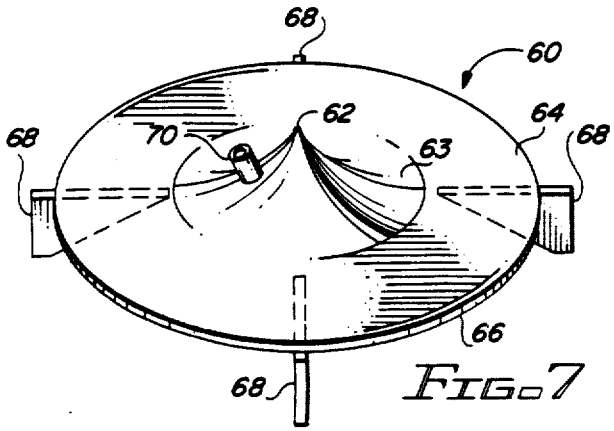
FIG. 7

ENERGY AMPLIFIER APPARATUS

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to energy amplifying apparatus, and more particularly, to apparatus for utilizing the force of gravity to compress air entrained in falling water and for separating the compressed air from the water for utilization of the compressed air.

2. Description of the Prior Art

During the latter part of the nineteenth century and the first part of the twentieth century, hydraulic air compressors were used as a comparatively simple solution for utilizing water power to compress air when compressed air in large quantities was required and where water was available. However, in the twentieth century, the availability of cheap fossil fuels, such as gasoline [and], diesel fuel, and electricity, made the relatively cumbersome apparatus and relatively high initial installation costs of such hydraulic air compressors impractical. A hydraulic compressor uses falling water for compressing air without the use of mechanical moving parts. Air is entrained by water falling through a venturi. As the water and entrained air falls, the air entrained in the water is compressed in accordance with the distance that the entrained air and water falls. At the bottom of the air compressor, the compressed air is separated from the water and then conducted or piped to a location at which the compressed air is to be used.

Two factors are of relative importance in analyzing hydraulic compressors. One factor is the eductor which is used to entrain air in falling water, and the second factor is the total height or depth that the water falls. The compression of the air is accomplished by the weight of the falling water, and the extent of the compression is accordingly a factor of the height of the water column above the separator where the air is separated from the water. Thus the entrainment of the air in terms of cubic feet of air per gallon of water becomes meaningful when a time factor or scale is considered. The more air per gallon of water per minute [than] *that* an eductor can entrain, the more efficient the hydraulic compressor or energy amplifier will be. However, the ability of a separator to separate the air from the water is a third factor which must be taken into consideration in terms of size. The smaller the overall size of the apparatus, and the greater the output in terms of compressed air, obviously the greater the likelihood of commercial usage. Thus a relatively small diameter separator is highly desirable.

One of the drawbacks of prior art hydraulic compressors or energy amplifiers has been the relatively large quantity of water required and the relatively large area or volume required as a base installation for the apparatus. Another drawback of the prior art is the difficulty in separating the compressed air from the water, and the cumbersome apparatus required for separation.

Another drawback of the prior art comprises friction losses by the falling water in metal pipe which substantially reduces efficiency.

The apparatus of the present invention utilizes relatively small area or volume for both the entrainment of the air and for the separation of the air from water to provide an efficiency substantially improved over the prior art.

For an in-depth study of the history and theory of hydraulic air compressors, see Information Circular 7683, Bureau of Mines, U.S. Department of Interior, May 1954, entitled "Hydraulic Air Compressors." The circular is authored by Leroy E. Schulze.

SUMMARY OF THE INVENTION

The apparatus of the present invention comprises an energy amplifier apparatus including a single elongated cylinder for hydraulically compressing air using [multi-stage] air entrainment and [multi-stage] air-water [separators] *separator* coaxially disposed within the single cylinder.

Among the objects of the present invention are the following:

to provide new and useful energy amplifier apparatus;

to provide new and useful apparatus for hydraulically compressing air;

to provide for the [multi-stage] entrainment of air in a single cylinder;

to provide new and useful [multi-stage] air-water separator apparatus;

to provide new and useful energy amplifier apparatus in a single cylindrical column; and to provide new and useful apparatus for amplifying the energy of falling water.

BRIEF DESCRIPTION OF THE DRAWING

[FIG. 2b comprises a continuation of FIG. 2a.]

FIG. 3 is a view in partial section of a portion of the apparatus of FIG. 1 taken generally along line 3—3 of FIG. 1.

FIG. 4 is a view in partial section of a portion of the apparatus of FIG. [2a] *2* taken generally along line 4—4 of FIG. [2a] *2*.

FIG. 5 is a view in partial section of a portion of the apparatus of FIG. [2a] *2* taken generally along line 5—5 of FIG. [2a] *2*.

[FIG. 6 is a view in partial section of a portion of the apparatus of FIG. 2b taken generally along line 6—6 of FIG. 2b.]

[FIG. 7 is a view in partial section of a portion of the apparatus of FIG. 2b taken generally along line 7—7 of FIG. 2b.]

FIG. [8] *6* is a view in partial section of a portion of the apparatus of FIG. [2b] *2* taken generally along line [8—8] *6—6* of FIG. [2b] *2*.

[FIG. 9 is a view in partial section of a portion of the apparatus of FIG. 2b taken generally along line 9—9 of FIG. 2b.]

FIG. [10] *7* is a perspective view of a separator cone employed in the apparatus of the present invention.

DESCRIPTION OF THE PREFERRED EMBODIMENT

Figure 1:
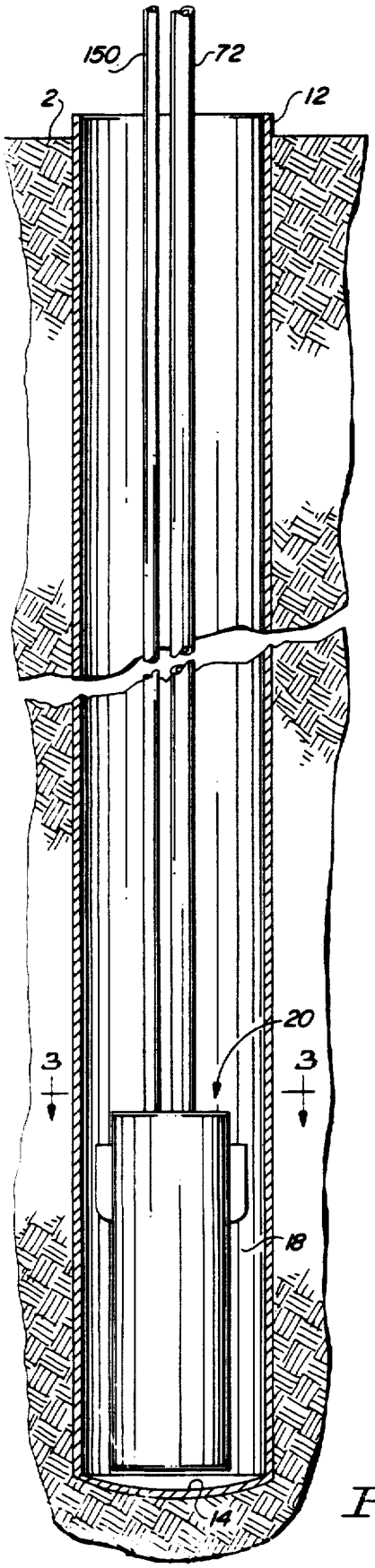
FIG. 1 is a vertical view in partial section of the apparatus of the present invention.

FIG. 1 is a view in partial section of energy amplifier apparatus 10 of the present invention. The view is broken for convenience due to the extended overall length of the apparatus. The energy amplifier apparatus 10 includes an outer cylinder or cylindrical housing 12 which extends into ground 2, such as in a well, or the like. The overall length of the cylinder 12 may be any appropriate length, depending on the available space and resources and the air pressure desired. Typically, the overall length of the cylinder 12 will be from about one hundred (100) feet to about two hundred fifty-four (254) feet (30.5–77.5 meters). With the apparatus of the present invention, this yields compressed air from forty-three (43) P.S.I. to about one hundred ten (110) P.S.I., which is sufficient air pressure for air turbines of contemporary design. Greater lengths may be used to obtain higher pressures for applications requiring higher pressures, such as air lift pumps of water, to obtain deeper submergence ratios, etc. The cylinder 12 is open at the top but is closed at the bottom by a lower cylinder head or cylinder bottom 14, which comprises a lower end wall for the outer cylinder.

Within the outer cylinder 12 is an inner cylinder 20. Between the inner cylinder and outer cylinder is a space 18. The purpose of the space 18 will be discussed in detail below in conjunction with FIGS. 2a and 2b. The inner cylinder 20 is preferably disposed at the lower portion of the outer cylinder 12, adjacent the bottom 14 of the outer cylinder 12.

Extending upwardly from the inner cylinder 20 are [four] *two* pipes, including [three] down [pipes] *pipe* 72[, 102, and 132], and a compressed air pipe 150. The down [pipes] *pipe* 72[, 102, and 132 carry] *carries* water and entrained air downwardly to the inner cylinder 20, and to [separators] *a separator* within the inner cylinder 20, and the compressed air pipe 150 carries compressed air from the inner cylinder 20 upwardly to appropriate storage tanks or to equipment, such as an air turbine, and the like, which will utilize the energy of the compressed air.

While various sizes of inner and outer cylinders may be used, nominally the diameter of the outer cylinder 12 may be about thirty inches, while the nominal diameter of the inner cylinder 20 may be about twenty-six inches. The diameter of the [three] down [pipes] *pipe* for transmitting water and entrained air to the [separators] *separator* within the inner cylinder 20 is about eight inches. The overall length or height of the outer cylinder 12 may be as desired, but preferably from about one hundred to three hundred feet, as discussed above, for an air turbine application.

Figure 2:
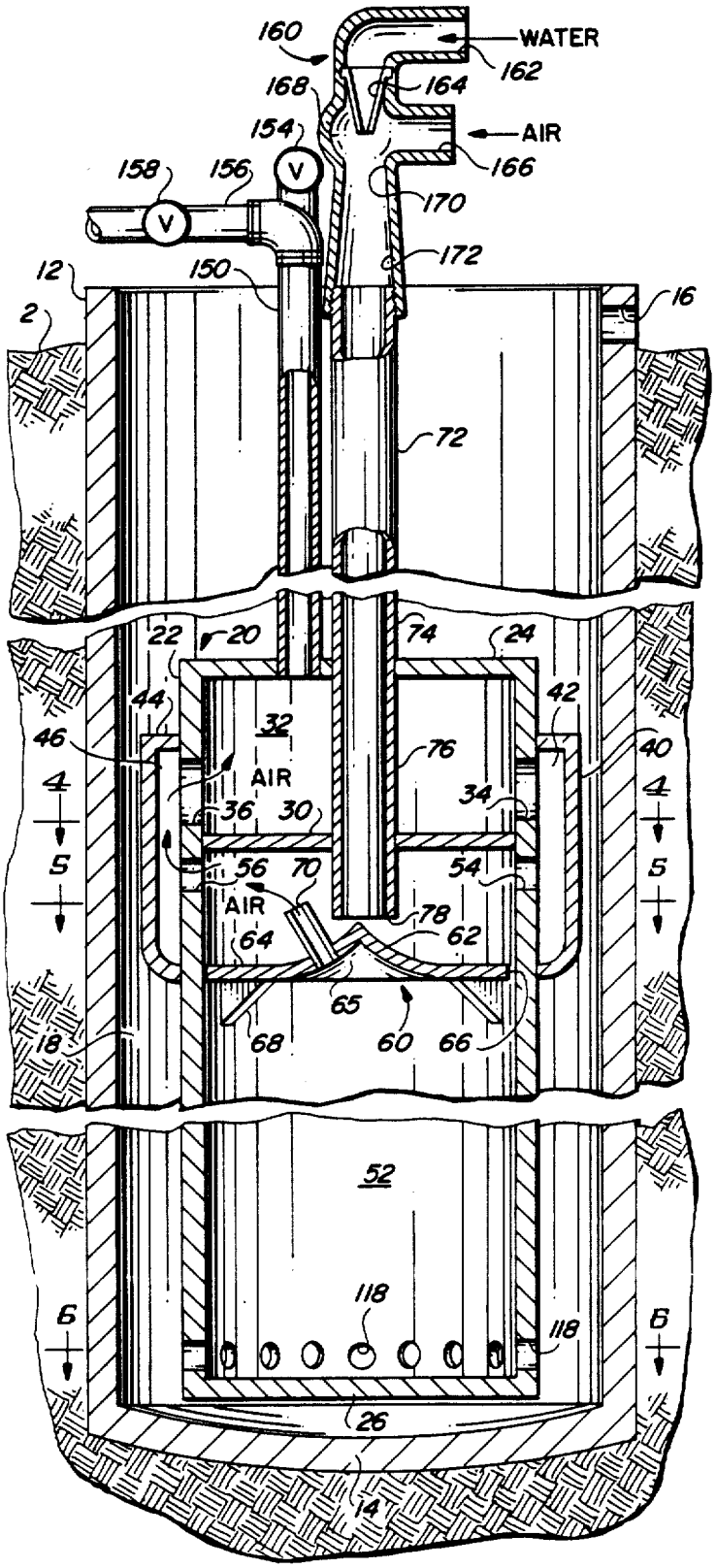
FIG. 2[, including FIGS. 2a and 2b,] is an enlarged view in partial section of the apparatus of FIG. 1.

FIG. 2 comprises an enlarged view in partial section of the apparatus of FIG. 1, with portions broken away, to illustrate the [eductors] *eductor* and the [separators] *separator* within the inner cylinder 20. [FIG. 2 is broken down or separated into FIGS. 2a and 2b, with FIG. 2a comprising the upper portion of the apparatus 10, and FIG. 2b comprising a continuation of FIG. 2a from the bottom or lower portion of FIG. 2a. Accordingly, reference will be made to both FIGS. 2a and 2b in the following discussion.]

The energy amplifier apparatus 10 of the present invention comprises the outer cylinder 12 extending downwardly into the ground 2 a finite distance, as previously discussed. The outer cylinder 12 extends upwardly out of the ground a short distance, for convenience of working with the apparatus and also for convenience of draining water from the outer cylinder 12 through an aperture 16. The flow of the water will be discussed in detail below.

Extending upwardly from the interior of the outer cylinder 12 [are three eductors] *is eductor* 160[, 180, and 190]. The [eductors are] *eductor is* secured to the [three] down [pipes, respectively down pipes 102,] *pipe* 72[, and 132]. The purpose of the [eductors] *eductor* is to entrain air within a flow of water. The water, with the air entrained, then flows downwardly by gravity through the down [pipes] *pipe* to a [multi-stage] separator portion 20 of the apparatus 10. The separator portion 20 comprises an inner cylinder, within which [are three separators] *is the separator*. At the top of the separator *portion* 20 is an air cavity 32 which receives compressed air from [each of] the [three separators] *separator*. Compressed air from the air cavity 32 flows upwardly in the pipe 150.

Above the top of the outer cylinder 12 the pipe 150 is secured to an elbow 152. The elbow 152 includes a pressure relief valve 154 [limits] *to limit* the maximum pressure of the compressed air flowing upwardly in the pipe 150. Another pipe 156 is also secured to the elbow 152, and a valve 158 is shown in pipe or compression line 156. Compressed air then flows through the pipe 156 and through the valve 158 to a storage tank or to an appropriate location for use of the compressed air with machinery, or the like.

The eductor 160, which is secured to down pipe [102] *72*, is shown in partial section. The eductor 160 includes a water inlet 162 which is appropriately secured to a source of water, such as to a pipe connected to a reservoir and a pump. The water flowing out of the aperture 16 of the outer cylinder 12 may flow to a reservoir, and may *in* turn [in] be pumped to the inlet of the [eductors 160, 180, and 190] *eductor*. The water is then reused by recirculating it back to the [eductors] *eductor*.

From the inlet 162, water under pressure flows into and through a converging nozzle 164 and into a vacuum chamber 168. The vacuum chamber 168 is connected to an air inlet 166. The water from the nozzle 164 flows through the vacuum chamber 168 and into a venturi 170. The flow of the water from the nozzle 164 into the venturi 170 results in a drop in the air pressure in the vacuum chamber 168 which draws air through the air inlet 166. Th air mixes with the water in the vacuum chamber 168 and in the venturi 170. The air is thus entrained into the water and the combination air and water then flows through a diverging cone 172 of the eductor into the down pipe [102] *72*.

A single nozzle eductor or water jet exhauster is illustrated in FIG. [2a] *2*, but preferably, for more efficiency, multi-nozzle water jet exhausters or eductors may be used with apparatus of the present invention to maximize the amount of air entrained in the water. Thus, by enlarging the vacuum chamber 168 and the venturi, and by increasing the number of nozzles through which the water flows into the venturi area of the eductor, a greater efficiency may be obtained by entraining more air per volume of water flowing through the eductor than is possible with a single nozzle eductor[, such as the illustrated eductors 160, 180, and 190]. Such multi-nozzle water jet exhausters are state of the art apparatus for various applications.

[The eductors 180 and 190 are substantially identical to the eductor 160. All three of the eductors are thus open to the intake of air and each eductor is connected to a source of water.] The flow of the water from a nozzle or nozzles into the venturi results in low pressure developing which causes a suction through an air inlet, such as air inlet 166. The in-flowing air is mixed with the water in the venturi [sections] *section* of the [eductors] *eductor*. The water, with the air entrained, then flows through [each of] the down [pipes] *pipe* 72[, 102, and 132]. From the [eductors] *eductor*, the water and entrained air flows downwardly through the down [pipes] *pipe* under the force of gravity. The falling water compresses the entrained air as the water and air move downwardly in the [pipes] *pipe*. The amount or degree of compression varies according to the length of the column of water and accordingly with the overall length of the pipe [or pipes] between the [eductors] *eductor* and the separator [or separators]. The longer the pipe, or the length of fall of the air and water, the greater the compression of the entrained air.

The air and water is separated at the bottom or lower portion of the outer cylinder 12 by [separators] *a separator* within the inner cylinder 20. The inner cylinder 20 includes a cylinder wall 22 which is closed at its top by a cylinder head 24 and at its lower end by a bottom 26. Spaced apart downwardly from the cylinder head or top 24 is a bulkhead 30 which is sealingly secured to the cylinder wall 22. Within the cylinder 20 and between the cylinder head 24 and the bulkhead 30 is the air cavity 32. The compressed air pipe 150 extends through the cylinder head 24 and communicates with the air cavity 32.

The [three] down [pipes 102,] *pipe* 72[, and 132 extend] *extends* through both the top cylinder head 24 and the bulkhead 30. The [pipes are] *pipe is* appropriately sealingly secured to the heads.

FIG. 3 is a view in partial section of the apparatus of the present invention taken generally along line 3—3 of FIG. 1. It comprises a vertical view in partial section through the outer cylinder 12 above the upper wall or cylinder head 24 of the cylinder 20. The [three] down [pipes] *pipe* 72[, 102, and 132 are] *is* shown [spaced apart from each other and] disposed symmetrically with respect to the cylinder 20, and with respect to its cylinder head 24. The compressed air pipe 150 is also shown with respect to the cylinder 20 and its cylinder head 24.

The inner cylinder 20 includes a pair of outer tubes 40 and 44 secured to the outer periphery of the cylinder 20 and disposed diametrically apart from each other across the cylinder. The tubes 40 and 44 are shown more clearly in [FIGS. 2a and 2b] *FIG. 2*.

The down pipe 72 includes an inwardly extending portion 74 which extends to the center of the cylinder 20 above the cylinder head 24. The inwardly extending portion 74 terminates in the center of the head 24, coaxially with respect to the cylinder 20, and concentric with respect to the head 24. The relationship between the down pipe 72, its inwardly extending portion 74, and a centrally or coaxially disposed lower portion 76 is further illustrated in FIG. [2a] *2*. The centrally disposed portion 76 of the down pipe 72 extends through both the cylinder head 24 and the bulkhead 30 coaxially with respect to the inner cylinder 20 and terminates in a lower portion 78 above a separator 60.

FIG. 4 is a view in partial section of the apparatus of FIG. [2a] *2* taken generally along line 4—4 of FIG. [2a] *2*. The [Figure] *figure* illustrates the interior of the air cavity 32 of the inner cylinder 20 above the bulkhead 30. The central portion of the down pipe 76 is located coaxially within the inner cylinder 20, and concentrically with respect to the bulkhead 30. [The down pipes 102 and 132 continue downwardly in a straight line, as they are shown in FIG. 2a and in FIG. 3.] The air transport tubes 40 and 44 are also shown in FIG. 4 as sealingly secured to the outer periphery of the inner cylinder 20.

Returning again to [FIGS. 2a and 2b] *FIG. 2*, it will be noted that spaced apart below the bulkhead 30 is [another bulkhead 50] *bottom 26*. A chamber 52 is defined between the [bulkheads] *bulkhead* 30 and [50] *bottom 26*. The chamber 52 comprises the [first stage] separator for the energy amplifier apparatus 10.

About one-fourth of the way downwardly between the bulkhead 30 and the [bulkhead 50] *bottom 26* is a separator cone 60. The separator cone 60 is of a generally circular configuration, slightly less in overall diameter than the interior diameter of the inner cylinder 20. The cone 60 is concentrically disposed within the inner cylinder 20 and is secured to the interior of the cylinder walls 22 by a plurality of gussets or braces 68. The cone 60 includes a central apex 62 and a generally flat outer portion 64. Between the apex 62 and the flat portion 64 is a concavely curved portion 63. The curved portion 63 blends into the generally flat portion 64, and the flat portion 64 terminates at an outer edge 66. A relatively narrow space exists between the outer edge 66 of the separator cone 60 and the interior of the wall 22 of the cylinder 20. The apex 62 is centrally disposed with respect to the cone 60, and accordingly with respect also to the cylinder wall 22 of the cylinder 20.

Above the cone 60 is the down pipe 72. As best seen in FIG. 3, the down pipe 72[, along with the down pipes 102 and 32, are] *is* spaced apart relatively symmetrically with respect to the inner cylinder 20 and also with respect to the outer cylinder or casing 12. However, as may be seen in FIG. [2a] *2* and also in FIGS. 3 and 4, the down pipe 72 includes an inwardly extending portion 74 and a central portion 76. That is, the down pipe 72 includes a portion 74 which extends downwardly inwardly to where it transitions to a central portion 76 just above the cylinder head 24 of the cylinder 20. The central portion 76 then extends downwardly through the cylinder head 24, through the bulkhead 30, and into the upper portion of the chamber 52, substantially coaxially with the cylinder 20 and also with the separator cone 60. The central portion 76 of the down pipe 72 terminates in a bottom 78 which is disposed at about the same level as the apex 62 of the separator cone 60.

Water flowing into the eductor [180] *160* entrains air, and the air and water together flow downwardly through the pipe 72. As the air and water fall in the pipe, the entrained or trapped air is compressed in a relationship which varies according to the length of the pipe 72. For separation purposes, the down pipe 72 curves inwardly just before reaching the cylinder 20 so that the bottom portion 78 of the tube 72 will be coaxially disposed in the chamber 52 of the cylinder 20 and over the apex 62 of the cone 60. The water and entrained air accordingly flow through the pipe 72 and into the separator chamber 52 and onto the cone 60.

The cone 60 causes the water to move outwardly from its original downward flow. As the water moves outwardly from the curved portion 63 of the cone to the flat portion 64, there is a change in the direction of the flow of the water and entrained and compressed air in the amount of about ninety degrees. During the change of direction, and particularly on the generally outwardly flow of the air and water on the flat portion 64 of the cone, a separation between the air and water takes place. The entrained and compressed air separates from the water and the compressed air flows upwardly (rises) toward the top portion of the chamber 52, while the water flows downwardly, through the space between the outer edge 66 of the cone and the walls 22 of the cylinder, and downwardly into the lower portion of the chamber 52.

The compressed air, rising in the chamber 52, flows outwardly through a pair of apertures 54 and 56 into the air transport tubes 40 and 44, respectively. The compressed air continues to rise in the chambers or air transport cavities 42 and 46 of the air tubes 40 and 44, respectively. From the air tubes 40 and 44 the air flows inwardly into the air cavity 32 through a pair of apertures 34 and 36 from the air tubes 40 and 44, respectively. The apertures 34 and 36 extend through the cylinder walls 22 of the cylinder 20 adjacent the tops of the air transport tubes to provide communication between the air cavity 32 and the air chambers 42 and 46 of the air tubes 40 and 44, respectively.

Most of the entrained air is separated from the water by the separator 60 between the end or bottom 78 of the down pipe 72 and the outer edge 66 of the air separator cone 60. With respect to the cone 60, most of the air is separated as the water flows substantially horizontally over the flat portion 64 of the air separator cone 60. However, some of the entrained air flows over the outer edge 66 and downwardly with the flow of water into the lower portion of the chamber 52. The water with a residue of the entrained air, flows between the outer edge 66 of the cone 60 and the inner wall 22 of the cylinder 20. The water flows downwardly in the chamber 52 to the [bulkhead 50] *bottom 26*, which defines or comprises the bottom of the chamber 52. [The bulkhead 50 also defines the top of a second separator chamber 82 disposed beneath the first separator chamber 52.]

A plurality of apertures [58] *118* extend through the cylinder wall 22 above the [bulkhead 50] *bottom 26*, as shown in FIG. [2b] *2*, to provide communication between the chamber 52 and the space 18 (see FIGS. 1 and [2a] *2*) between the inner cylinder 20 and the outer cylinder 12. Between the separator cone and the [bulkhead 50] *bottom 26*, substantially all the rest of the entrained air, not separated on the top of the separator cone 60, is separated from the water before the water flows out of the chamber 52 through the apertures [58] *118*.

The air thus separated rises in the chamber 52 to the underside of the separator cone 60, which comprises a dome 65. Adjacent the apex 62, a tube 70 extends through and is secured to the separator 60. The top of the tube 70 extends slightly above the bottom 78 of the down pipe 72. The purpose of the tube 70 is simply to bleed away the air trapped beneath the dome 65 of the separator cone 60. The air is thus conveyed into the upper portion of the chamber 52 where the air mixes with the air separated by the separator cone 60. Accordingly, substantially all of the entrained air, under pressure, is separated from the water and flows out of the chamber 52, into the transport tubes 40 and 44, and upwardly into the air cavity 32.

From the air cavity 32, the compressed air flows upwardly through the compressed air pipe 150 which conveys the air for utilization at the top of the apparatus, as illustrated in FIGS. 1 and [2a] *2*.

At the top of the air transport pipe 150 is an elbow 152 to which is connected another pipe 156. A pressure relief valve 154 is also connected to the elbow 152 for the purpose of limiting the pressure of the compressed air. From the pipe 156, the air flows through a valve 158 for distribution or transport, as desired.

[The down pipes 102 and 132 extend downwardly through the chamber 52. As with the down pipe 72, and particularly the central portion 76 of the down pipe 72, the down pipes 102 and 132 are sealingly secured to the cylinder head 24, and the bulkhead 30 and also to the separator cone 60 through which the down pipes 102 and 132 extend. Obviously, to prevent loss of efficiency due to escape of air and water, the down pipes must be sealingly secured to the respective bulkheads and cones through which they extend.]

[Within the chamber 52, the down pipe 102 includes an inwardly and downwardly extending portion 104. Secured to the inwardly and downwardly extending portion 104 of the down pipe 102 is a central portion 106. The purpose of the inwardly extending portion 104 is simply to permit the down pipe 102 to be centrally located with respect to the inner cylinder 20 within the chamber 52. The inwardly extending portion 104, like the inwardly extending portion 74 of down pipe 72, is simply an intermediate portion between the central portion 106 and the main portion of the down pipe 102.]

[The central portion 106 of the down pipe 102 extends through the bulkhead 50 and it is sealingly secured thereto, as shown in FIG. 2b. The down pipe 132 also extends through the bulkhead 50 and is also sealingly secured thereto. The down pipe 132 continues downwardly through a chamber 82 defined between the bulkhead 50 and a lower bulkhead 80. The bulkhead 80 comprises the lower or bottom end wall of a chamber 82 which extends between the bulkhead 50 and the bulkhead 80 and within the cylinder walls 22 of the inner cylinder 20. At the lower portion of the chamber 82 is a plurality of apertures 88 which extend through the cylinder wall 22 to provide communication for the flow of water from the chamber 82 within the inner cylinder 20 to the chamber or space 18 between the inner cylinder 20 and the outer cylinder 12.]

[The chamber 82 comprises a second stage separator, or a second separator, for the apparatus of the present invention. Within the chamber 82, substantially identical to the separator cone 60, is a separator cone 90. The separator cone 90 includes a central apex 92, and a somewhat concavely curved portion 93 which extends downwardly and outwardly from the apex 92. The curved portion 93 transitions to a flat, outwardly extending portion 94. The separator cone 90 terminates in an outer or peripheral edges 96. The outer or perpheral edge 96 is, like the edge 66 of the separator cone 60, spaced inwardly, and slightly apart, from the inner wall of the inner cylinder 20. Since the cone 90 is substantially symmetrical in overall design, and is located coaxially with respect to the cylinder 20, there is a uniform distance between the inner wall 22 of the cylinder 20 and the outer edge or rim 96 of the cone 90. The separator cone 90 is secured to the cylinder wall 22 by a plurality of plates or gussets 98.]

[Beneath the separator cone 90, extending downwardly and outwardly from beneath the apex 92, is a dome 95. A tube 100 provides communication between the dome 95 and the upper portion of the chamber 82 above the separator 90. The down pipe 106 terminates in a bottom 108 slightly above, and substantially concentric with the apex 92 of the separator cone 90.]

[An aperture 84 extends through the cylinder wall 22 below the bulkhead 50 to provide communication between the chamber 82 and the chamber or air transport cavity 42 of the air transport tube 40. A second aperture 86 extends through the cylinder wall 22 diametrically opposite the aperture 84 to provide communication between the chamber 82 and the air cavity 46 of the air transport tube 44.]

[The down pipe 132, as discussed above, extends through the bulkhead 50, and it also extends through the cone 90. Beneath the cone 90, the down pipe 132 includes an inwardly and downwardly extending portion 134 which connects to a centrally disposed portion 136. The central portion 136 extends downwardly coaxially with respect to the cylinder 22 through the lower bulkhead 80.]

[The action of the air and water flowing downwardly through the down pipe 102 and onto the separator cone 90 is substantially the same as discussed above with respect to the separator chamber 52 and the separator cone 60. The water, with entrained air, flows downwardly through the pipe 106 and onto the separator cone 90. The water flowing outwardly over the generally flat portion 94 of the cone, which is substantially horizontal, allows the entrained air to separate from the water. The separated and compressed air rises in the upper portion of the chamber 82 above the separator cone 90 and flows outwardly through the apertures 84 and 86 into the air transport cavities 42 and 46, respectively.]

[A portion of the entrained air does not separate from the water before flowing between the edge or outer periphery 96 of the separator cone 90 and the wall 22 of the cylinder 20. The compressed air that remains entrained in the water then flows downwardly within the chamber 82 beneath the separator cone 90 and separates out of the water before the water flows through the apertures 88 out of the chamber 82 and into the chamber 18. The compressed air rises within the chamber 82 to collect beneath the dome 95 of the separator cone 90. The air from the dome 95 then bleeds or flows through the tube 100 from beneath the dome 95 of the cone 90 to the upper portion of the chamber 82 above the cone 90 to join with the other air separated from the continual flow of water over the cone 90.]

[Between the lower bulkhead 80 of the chamber 82 and the bottom 26 of the cylinder 20 is a third separator stage which includes a separator chamber 112. Within the separator chamber 112 is a separator cone 120. The cone 120, like the cones 60 and 90, is generally circular in configuration, with a central apex 122 extending upwardly above a generally flat outer planar portion 124. The cone includes a generally downwardly and outwardly curved portion 123 between the apex 122 and the flat or planar portion 124. The planar portion 124 of the cone 120 terminates in an outer peripheral edge 126 which is spaced slightly inwardly from the inner portion of the cylinder wall 22.]

[The cone 12 is secured to the cylinder walls 22 by a plurality of gussets or braces 128. The bottom of the cone 120, between the apex 122 and the flat portion 124, defines a dome 125. A tube 130 extends through the cone 120 to provide communication between the dome 125 and the upper portion of the chamber 112 above the separator cone 120.]

[The bottom end of the central portion 136 of the down pipe 132 terminates in a bottom portion 138 which is disposed substantially concentrically to, and about even with, the apex 122 of the separator 120.]

[At the lower portion of the chamber 112 is a plurality of apertures 118. The apertures extend through the cylinder walls 22 to provide communication between the lower portion of the chamber 112 and the space 18. At the upper portion of the chamber 112, above the separator cone 120 and adjacent the bulkhead 80, are a pair of apertures 114 and 116. The apertures 114 and 116 extend through the cylinder wall 22 to provide communication between the upper portion of the chamber 112 and the air transport cavities 42 and 46, respectively.]

[The action of the water and entrained air in the third separator stage, defining the chamber 112, is substantially as has been discussed in detail above in conjunction with the first separator stage and the second separator stage, including the chamber 52 and its separator cone 60 and the chamber 82 and its separator cone 90, respectively. Thus, the entrained air flows downwardly through the down pipe 132 and onto the separator cone 120 through the bottom 138 of the center portion 136 of the down pipe or tube. As the water flows downwardly and outwardly, substantially horizontally, over the flat portion 124 of the separator cone 120, the entrained and compressed air separates from the water and flows upwardly in the chamber 112. The water, with some air yet entrained, flows downwardly into the lower portion of the chamber 112 between the outer periphery 126 of the separator cone 120 and the interior of the cylinder wall 22. The air not separating from the water above the cone 120 separates from the air beneath the cone 120 in the chamber 112, and flows upwardly to be trapped against the dome 125 of the cone 120. The air flows out of the dome 125 through a tube 130 which extends through the separator cone 120 adjacent the apex 138 and outwardly with respect to the down pipe 136. The air from the upper portion of the chamber 112 then flows outwardly through the apertures 114 and 116 into the air transport cavities 42 and 46, respectively.]

As discussed above, the air transport tubes 40 and 44 are sealingly secured to the outer periphery of the cylinder wall 22 of the inner cylinder 12, as shown in detail in FIGS. 3, 4, *and* 5[, 6, 7, 8, and 9]. The air transport cavities 42 and 44 communicate with the separator [chambers] *chamber* 52[, 82, and 112] through the apertures 54, 56 of the chamber 52[, apertures 84, 86 of the chamber 82, and apertures 114 and 116 of the chamber 112]. From the separator [chambers] *chamber*, the air flows into the chamber or air cavity 32 and thence upwardly through the pipe 150. The water, minus the entrained air, flows outwardly from the [chambers] *chamber* 52[, 82, and 112,] through the apertures [58, 88, and] 118[, respectively,] into the space or chamber 18 between the outer cylinder 12 and the inner cylinder 20.

The substantially constant flow of the water through the down [pipes] *pipe*, through or from the [eductors] *eductor*, provides a slightly larger head of downwardly moving water than the upwardly flowing water, and the water accordingly flows upwardly through the space or chamber 18 within the outer cylinder 12 and out through the aperture 16 disposed near the top of the pipe 12. The water from the aperture 16 (see FIG. [2a] *2*) then flows into a basin or reservoir for reuse with the [eductors] *eductor* 160[, 180, and 190] for the entrainment of more air, and so on. The water is reuseable, and accordingly is recycled. The only energy input required for the energy amplifier apparatus of the present invention is the energy required to pump the water from the basin or reservoir (not shown), to which the water flows from the aperture 18 to the [three eductors] *eductor*. Gravity supplies the energy for compressing the air entrained in the falling water.

FIG. 4 is a view in partial section of the apparatus of FIG. [2a] *2* taken generally along line 4—4 of FIG. [2a] *2*. It comprises a vertical view in partial section through the inner cylinder 20 above the bulkhead 30. The air transport tubes 40 and 44, with their interior chambers 42 and 46, respectively, are clearly shown. The tubes 40 and 44 are diametrically opposed to each other and are secured to the outer periphery of the cylinder wall 22 of the inner [cyinder] *cylinder* 20. The tubes 40 and 44 do, as best shown in [FIGS. 2a and 2b] *FIG. 2*, extend vertically axially along the cylinder 20.

The bulkhead 30 is shown extending completely across, and appropriately secured to, the cylinder walls 22 of the inner cylinder 20. [All three down pipes] *Down pipe* 72[, 102, and 132 are] *is* shown extending through the bulkhead 30 within the cylinder wall 22. The central portion 76 of the down pipe 72 is shown disposed coaxially with respect to the inner cylinder 20 and to the bulkhead 30.

FIG. 4 is taken lower, with respect to the inner cylinder 20, than is FIG. 3. By comparing FIGS. 3 and 4, it is seen that the central portion 76 of the down pipe 72 is disposed beneath the inwardly and downwardly extending transition portion 74. As shown in FIG. 4, and as also shown in FIG. [2a] *2*, the lower portion 76 of the down pipe 72 is disposed centrally of the cylinder 20 and the bulkhead 30 for depositing the water and compressed and entrained air on the cone 60 for the separation of the entrained air from the water flowing downwardly from the pipe 72.

FIG. 5 is a view in partial section of the apparatus of FIG. [2a] *2* taken generally along line 5—5 of FIG. [2a] *2*. It comprises a view of the apparatus 10 taken below the bulkhead 30 of FIG. [2a] *2*, at about the bottom or lower termination 78 of the central portion 76 of the down pipe 72, and at the top of the separator cone 60. The apex 62 of the cone 60 is shown centrally disposed with respect to both the separator cone 60 and the inner cylinder 20, and also with respect to the lower, central portion 76 of the down pipe 72.

The air transport tubes 40 and 44 are shown substantially the same in FIG. 5 as they appear in FIGS. 3 and 4. [The down pipes 22 and 132 also appear substantially as shown in FIGS. 3 and 4. The down pipes 102 and 132 extend through, and are sealed to, the separator cone 60.]

The separator cone 60 is shown inside the inner cylinder 60, with the outer periphery 66 of the separator cone 60 spaced apart from the interior of the wall 22 off the inner cylinder 20. The cone is secured to the cylinder walls 22 by four braces or gussets 68. The braces or gussets 68 are spaced apart about 90 degrees from each other to provide appropriate strength for supporting the separator cone 60. The tube 70, which bleeds air from beneath the cone 60, is shown extending outwardly and upwardly from the cone adjacent the apex 62.

[FIG. 6 is a view in partial section of the apparatus of FIG. 2b taken generally along line 6—6 of FIG. 2b. It is substantially identical to FIGS. 3, 4, and 5, but taken below FIGS. 3, 4, and 5. It is a view in partial section through the lower portion of the separator chamber 52 slightly above the lower bulkhead 50. The bulkhead 50, like the bulkhead 30, is appropriately secured to the inner walls 22 of the cylinder 20. The bulkhead 50 comprises the bottom of the chamber 52 and the top of the chamber 82. The air transport tubes 40 and 44, with their chambers 42 and 46, respectively, also appear in FIG. 6 as they did in FIGS. 3, 4, and 5.]

[The down tube or down pipe 132 is shown extending through, and sealed to, the bulkhead 50. The central portion 106 of the down tube 102 is shown disposed coaxially within the inner cylinder 20 and the bulkhead 50. Referring to FIGS. 2a and 2b, the distance between where FIGS. 5 and 6 are taken shows the inwardly extending portion 104 of the down pipe 102 and the central portion 106 which is shown in FIG. 6. The central portion 106 is secured to the bulkhead 50, and like the down pipe 132, extend through the bulkhead 50 and into the separator chamber 82, as best shown in FIG. 2b.]

[FIG. 7 is a view in partial section of the apparatus of FIG. 2b taken generally along line 7—7 of FIG. 2b. It comprises a view in partial section in the separator chamber 82, through the air transport tubes 40 and 44, the air cylinder 20, and through the separator cone 90.]

[While FIG. 5 comprises a view above a separator or separator cone, FIG. 7 is taken through a separator cone. The separator 90 is shown supported by four gussets 98 secured to the inner periphery of the cylinder wall 22 of the inner cylinder 20. The down pipe 132 is sealingly secured to, and extends through, the separator cone 90. The outer periphery 96 of the separator 90 is shown spaced apart slightly from the inside or inner periphery of the cylinder walls 22.]

[Looking downwardly through the separator cone 90, the inwardly extending portion 134 of the down pipe 132 is shown extending from the down pipe 132 to the center of the cylinder 20. This is shown in greater detail in FIG. 2b.]

FIG. [8] *6* is a view in partial section of a portion of the apparatus of FIG. [2b] *2* taken generally along line [8—8] *6—6* of FIG. [2b] *2*. It comprises a view in partial section through the lower portion of separator chamber [82] *52* above the [bulkhead 80] *bottom 26*. [As in FIGS. 3 . . . 7, inner cylinder 20 is shown in partial section. The air transport tubes 40 and 44 are shown secured to the outer periphery of the inner cylinder 20. The bulkhead 80] *Bottom 26*, which defines the bottom wall of the chamber [82] *52*, is shown sealingly secured to the inner periphery of the cylinder wall 22. [The central portion 136 of the down pipe 132 extends through the bulkhead 80 and is sealingly secured thereto.]

[The apex 122 of the separator cone 120 is shown through the down pipe 132. A portion of the air bleed tube 130 is also shown through the down tube or pipe 132. The tube 130 is best shown in FIG. 2b. It communicates with the underneath portion 125 of the separator cone 120 to allow air separated from water in the lower portion of chamber 112 to move upwardly, into the upper portion of the chamber 112, from beneath the separator 120.]

Extending through the cylindrical wall 22 adjacent the [bulkhead 80] *bottom 26*, are a number of ports or apertures [88] *118*. The apertures [88] *118* extend through the cylinder wall 22 to allow the water within the separator chamber [82] *52* to [fllow] *flow* outwardly into the space 18 (see FIG. [2b] *2*) between the inner cylinder 20 and the outer cylinder 12. It will be noted that the apertures [88] *118* are spaced regularly about the cylinder 20 [except in the area of the air transport tubes 40 and 44. No apertures extend through the cylinder wall in the area of the air transport tubes] so that the water [does not flow into the transport tubes, but rather simply] flows through the cylinder 20 and outwardly of the cylinder. Thus, referring again to FIG. [2b] *2*, the water flowing downwardly into the chamber [82] *52* through the down pipe [102] *72* impinges on the separator cone [90] *60*. The outwardly flowing water, with its entrained air, loses most of the air as the water flows over the generally horizontally extending portion [94] *63* of the separator [90] *60*. While the compressed air thus separated from the water moves upwardly into the upper portion of the chamber [82] *52* and outwardly into the tubes 40 and 44, the water flows downwardly about the outer peripheral edge [96] *66* of the cone [90] *60* and into the lower or bottom portion of the chamber [82] *52*. The water then flows from the chamber [82] *52* out of the inner cylinder 20 through the apertures [88] *118*. The rest of the entrained air separated from the water in the lower portion of the chamber [82] *52* rises to the dome [95] *65* and escapes upwardly through the tube [100] *70*.

[The central portion 136 of the down pipe 132 is shown centered over the final or third stage separator cone 120. The cone 120 is supported in the cylinder 20 by four gussets or braces 128 which are appropriately secured to the bottom or underneath side of the flat portion 124 of the cone 120 and to the inner portion of the wall 22 of the cylinder 20. Spaced apart slightly from the apex 122 of the cone 120 is the tube 130. The tube allows air to bleed from beneath the cone 120, through the cone, and into the upper portion of the chamber 112.]

[The entrained air is separated from the water as the water and air flow downwardly through the down tube 136 and onto the top of the separator 120. Most of the entrained air is separated from the water as the water flows outwardly over the generally flat or planar portion 124 of the separator cone 120. While the water flows downwardly into the bottom portion of the chamber 120 between the outer periphery 126 of the separator cone 120 and the inner periphery of the cylinder wall 122, the formerly entrained air, compressed and separated from the water, rises within the chamber 122 above the cone 120 and flows outwardly through the apertures or holes 114 and 116 into the air transport cavities 42 and 46, respectively. The apertures 114 and 116 extend through the cylinder wall 22 to provide communication between the upper portion of the chamber 112 and the interior cavities or chambers 42 and 46 of the air transport tubes 40 and 44, respectively.]

[Each of the three] *The* separator [chambers, or separator stages,] *chamber* includes a pair of apertures such as shown in [FIGS. 2a, 2b, and 9,] *FIG. 2* which [communicates] *communicate* with the air transport tubes from the upper portion of [each] *the* chamber to allow the compressed and separated air to flow from the upper [portions] *portion* of the separator [chambers] *chamber* into the air transport tubes. At the same time, apertures or holes extending through the cylinder wall at the bottom or lower portion of the separator chamber [or stages allow] *allows* the water to flow out of the [chambers] *chamber* and into the space between the inner and outer cylinders. The water flowing out of the separator [chambers or stages] *chamber* rises in the space 18 between the inner and outer cylinders and back to the surface of the ground, as shown best in FIG. [2a] *2*.

FIG. [10] *7* comprises a perspective view of the separator cone 60. The cone 60 is generally circular in configuration, with a generally pointed central apex 62 extending upwardly above a flat, generally planar portion 64: Between the apex and the flat or planar portion 64 is a concavely curved portion 63.

The air bleed tube 70 is secured to, and extends through, the cone 60 at the curved portion 63 adjacent the apex 62. The upper or top most portion of the tube 70 extends slightly above the apex 62. The relative height of the tube and the apex may best be seen in FIG. [2a] *2*. The top upper portion of the tube 70 is disposed above the apex 62 so that the top of the tube is above the lower portion or bottom 78 of the down tube 72 to prevent water from flowing through the bleed tube. The water, with the entrained air, thus flows through the central portion 76 of the down tube 72 onto the separator cone 60. As the water flows down the curved portion 63 and out in a generally horizontal direction over the flat or planar portion 64 of the separator 60, the air separates from the water and rises above the cone 60 while the water flows downwardly, past the outer peripheral edge 66 of the cone 60 and into the bottom of the chamber 52. Any air still entrained in the water as the water moves downwardly past the separator cone rises within the chamber 52 and becomes trapped by the dome 65 beneath the cone 60 (see FIG. [2a*2*). The air, seeking the highest possible location with respect to the cone 60, moves to the dome 65 created beneath the apex 60 and the curved portion 63 of the cone 60 where it (the air) flows through the bleed tube 70.

The separator cone 60 is secured to the cylinder 20 by four gussets or braces 68. As shown in FIG. [10] *7*, the braces or gussets 68 are generally triangular in configuration, with the base of the triangle spaced apart outwardly a slight distance from the peripheral edge 66 of the cone. The gussets or braces are appropriately secured to the bottom side of the flat or planar portion 64 of the separator cone 60. When in position, as shown in FIG. [2a] *2*, within the inner cylinder 20, the cone 60 is disposed coaxially with respect to the cylinder 20, with the apex 62 of the cone 60 disposed in the center of the cylinder and also beneath the center of the central vertical portion 76 of the down pipe 72. The cone and the down pipe are thus coaxially disposed with respect to each other and with respect to the inner and outer cylinders.

The coaxial arrangement of the down [pipes] *pipe* or [conduits] *conduit* to the separator [cones] *cone* provides for a more uniform distribution or flow of water over the [*cones*] *cone*. Such an arrangement also provides maximum efficiency in separating the entrained air from the water by allowing maximum flow time for the water over the flat portions of the [separators] *separator*.

It will be noted, as best shown in [FIGS. 2a and 2b] *FIG. 2*, that the design of the separator [cones] *cone* allows the water from the down [tubes] *tube* to impinge on the curved portion of [each] *the* cone rather than directly onto the flat portion of the [cones] *cone*. The water then flows outwardly, substantially horizontally, to the outer or peripheral edge of the [cones] *cone*.

[The energy amplifier apparatus 10 is illustrated and discussed herein as having three stages of air entrainment and air separation, with the stages disposed adjacent each other in a vertical orientation. Three eductors are connected to three separators, on a one-for-one basis. Each eductor is connected to a separate conduit or pipe which extends vertically downwardly to a separator chamber.] As indicated previously, each eductor may utilize more than one nozzle, if desired, for increased efficiency of air entrainment. For illustrative purposes, a single nozzle 164 is shown in FIG. [2a] *2* for the eductor 160. The eductors are spaced apart vertically from the separator [stages] *stage* to provide a vertical fall distance that will produce or result in the desired amount of compression of the air.

The apparatus of the present invention is relatively compact due to the orientation of [each] *the* separator stage[, with the stages being disposed vertically adjacent each other]. [Each] *The* separator stage includes a chamber, a separator in the chamber, a conduit or pipe to transport the entrained air and water to the separator, and different flow paths for the separated air and water out of the chamber.

Using the force of gravity, the entrained air is compressed by the water in which it is entrained. After separation, the compressed air flows upwardly in a pipe or conduit for utilization of its energy, either adjacent or remote from the apparatus 10, as desired. The water also flows upwardly, between the outer pipe or cylinder 12 and the inner pipe or cylinder 20, to the surface of the ground 2, where it may be reused, if desired.

What is claimed is:

1. Energy amplifier apparatus, comprising in combination:

a flow of water, eductor means for entraining air in the flow of water;

first pipe means connected to [the] *said* eductor means for transporting the flow of water and entrained air from [the] *said* eductor means *to an outlet of said first pipe means*;

cylinder means connected to [the] *said* first pipe means for receiving the flow of water and entrained air and spaced apart downwardly from [the] *said* eductor means to allow the flow of water to compress the entrained air as the water flows in [the] *said* first pipe means to [the] *said* cylinder means;

separator chamber means disposed in [the] *said* cylinder means and into which [the] *said* first pipe means extends for receiving the flow of water and the compressed entrained air and having a cylinder wall [and], a first bulkhead and a second bulkhead, *said first and second bulkheads being* secured to [the] *said* cylinder wall;

cone means disposed *in said separator chamber beneath and* adjacent the *outlet of said* first pipe means [in the separator chamber means] and spaced apart from [the] *said* first bulkhead [and the], *said* second bulkhead and [from the] *said* cylinder wall [and], the water and entrained and compressed air [flows] *flowing* onto [the] *said* cone means for [separating] *separation of* the entrained and compressed air from the water;

second pipe means *in fluid communication with said separator chamber at an elevation above said cone means* for transporting the *separated and* compressed air from [the] *said* cylinder means; [and]

aperture means *disposed* in [the] *said* separator chamber means *at an elevation below said cone means* through which the water flows out of [the] *said* separator chamber means*; and*

*means for discharging the water flow from said aperture means at an elevation below said eductor means and above said separator chamber means.*

2. The apparatus of claim 1 in which [the] *said* cylinder means includes a first cylinder and a second cylinder disposed in [the] *said* first cylinder remote from [the] *said* eductor means, and the water flowing out of [the] *said* aperture means flows into [the] *said* first cylinder.

3. The apparatus of claim 2 in which [the] first pipe means is disposed in [the] *said* first cylinder.

4. The apparatus of claim 3 in which [the] *said* cylinder wall of [the] *said* separator chamber means comprises a portion of [the] *said* second cylinder.

5. The apparatus of claim 4 in which [the] *said* second cylinder includes an air cavity for receiving the *separated and* compressed air from [the] *said* separator chamber means, and [the] *said* second pipe means [is connected to] *being in fluid communication with* the air cavity for transporting the *separated and* compressed air from the air cavity.

6. The apparatus of claim 5 in which [the] *said* cone means includes:

a central apex disposed beneath the *outlet of said* first pipe means;

a curved portion extending downwardly and outwardly from [the] *said central* apex;

a flat portion extending outwardly from [the] *said* curved portion; *and* a peripheral edge adjacent [the] *said* flat portion and spaced inwardly from [the] *said* cylinder wall of [the] *said* second cylinder.

7. The apparatus of claim 6 in which [the] *said* cone means further includes*:* a dome beneath [the] *said central* apex and [the] *said* curved portion for receiving compressed air not separated from the flow of water by [the] *said* cone means but separated from the flow of water before the water flows out of [the] *said* aperture means[,]*;* and a pipe extending through [the] *said* cone means communicating with [the] *said* dome and terminating above [the] *said central* apex for bleeding off compressed air from [the] *within said* dome.

8. The apparatus of claim 6 in which [the] *said separator* chamber means further includes an air transport tube secured to [the] *said* second cylinder and communicating with the air cavity for transporting compressed air from [the] *said* separator chamber to the air cavity.

9. The apparatus of claim 2 in which [the] *said* second cylinder of [the] *said* cylinder means includes an air cavity disposed above [the] *said* separator chamber means for receiving compressed air from [the] *said* separator chamber means.

10. The apparatus of claim 1 in which [the] *said* cylinder means includes a first cylinder and a second cylinder disposed in [the] *said* first cylinder.

[11. The apparatus of claim 10 in which the separator chamber means comprises a plurality of separator chambers disposed in a vertical relationship in the second cylinder of the cylinder means;

the first pipe means comprises a plurality of pipes extending through the first cylinder of the cylinder means to the separator chamber means, and each pipe of the plurality of pipes terminates in a different separator chamber, with the number of pipes being the same as the number of separator chambers; and the eductor means comprises a plurality of eductors, with an eductor for each pipe of the plurality of pipes.]

[12. The apparatus of claim 11 in which the second cylinder of the cylinder means includes an air cavity disposed above the separator chambers for receiving compressed air from each separator chamber.]

[13. The apparatus of claim 12 in which the second cylinder of the cylinder means further includes an air transport tube communicating with each separator chamber for transporting compressed air from the separator chambers to the air cavity.]

[14. The apparatus of claim 13 in which the cone means includes a separator disposed beneath the termination of each pipe in each separator chamber to receive the flow of water and entrained air in each separator chamber for separating the entrained and compressed air from the flow of water.]

[15. The apparatus of claim 14 in which the second pipe means comprises a pipe extending through the first cylinder and connected to the air cavity for transporting compressed air from the air cavity.]

[16. The apparatus of claim 15 in which the aperture means in the separator chamber means comprises a plurality of apertures in each separator chamber beneath the cone means through which water flows from each separator chamber of the second cylinder into the first cylinder.]

[17. The apparatus of claim 16 in which the second cylinder of the cylinder means includes a bulkhead separating each separator chamber, and the bulkheads are spaced apart from each other by substantially equal distances, and the apertures of the aperture means in each separator chamber are disposed adjacent the bulkhead at the lower portion of each separator chamber.]

18. Apparatus for compressing air by falling water, comprising[,] in combination:

means for entraining air in falling water [for compressing] *to compress* the air; and means for separating the entrained and compressed air from the falling water, including:

a separator chamber, having a top wall, a bottom wall, and chamber walls, into which the falling water flows[,];

a separator in [the] *said* separator chamber below [the] *said* top wall and above [the] *said* bottom wall and spaced apart from [the] *said* chamber walls, for receiving the flow of falling water, having a generally horizontal portion on which the water flows to separate the compressed air from the water[,];

an air chamber disposed above [the] *said* separator chamber for receiving the separated and compressed air from [the] *said* separator chamber[,];

means disposed above [the] *said* separator for transporting the separated and compressed air from [the] *said* separator chamber, including an aperture extending through [the] *said* separator chamber and a conduit communicating with [the] *said* aperture and extending to [the] *said* air chamber[, and];

aperture means disposed below [the] *said* separator through which the water flows out of [the] *said* separator chamber; *and*

*means for discharging the water flow from said aperture means at an elevation below said entraining means and above said separator chamber.*

19. The apparatus of claim 18 in which the means for entraining air in falling water includes pipe means extending to [the] *said* separator chamber through which the water and entrained air falls.

20. The apparatus of claim 19 in which the means for entraining air in falling water further includes eductor means secured to [the] *said* pipe means through which the water falls.

21. The apparatus of claim 20 in which [the] *said* eductor means and the means for separating the entrained and compressed air are spaced apart vertically from each other.

[22. The apparatus of claim 21 in which the eductor means further comprises a plurality of eductors, and the means for separating the entrained and compressed air from the falling waters comprises a plurality of separator chambers disposed vertically adjacent each other and connected to the plurality of eductors, with an eductor for each chamber.]

*23. The apparatus of claim 1 in which said cone means includes:*

*a central apex disposed beneath the outlet of said first pipe means;*

*a curved portion extending downwardly and outwardly from said central apex;*

*a flat portion extending outwardly from said curved portion; and*

*a peripheral edge adjacent said flat portion and spaced inwardly from said cylinder wall of said second cylinder.*

*24. The apparatus of claim 23 in which said cone means further includes:*

*a dome beneath said central apex and said curved portion for receiving compressed air not separated from the flow of water by said cone means but separated from the flow of water before the water flows out of said aperture means; and*

*a pipe extending through said cone means communicating with said dome and terminating above said central apex for bleeding off compressed air from within said dome.*

*25. The apparatus of claim 24 in which said separator chamber means further includes an air transport tube secured to said second cylinder and communicating with the air cavity for transporting compressed air from said separator chamber to the air cavity.*

* * * * *